Oct. 3, 1961    G. X. R. BOUSSU ET AL    3,002,549
TIRE RETREADING SYSTEM
Filed Feb. 9, 1960
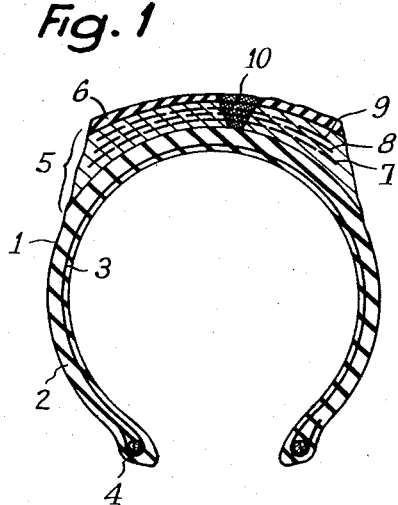
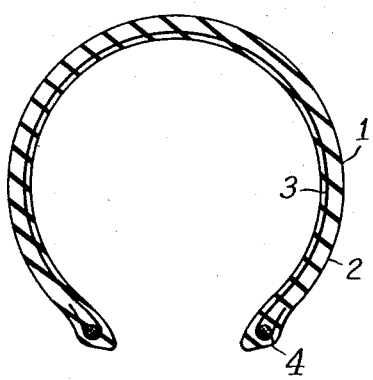
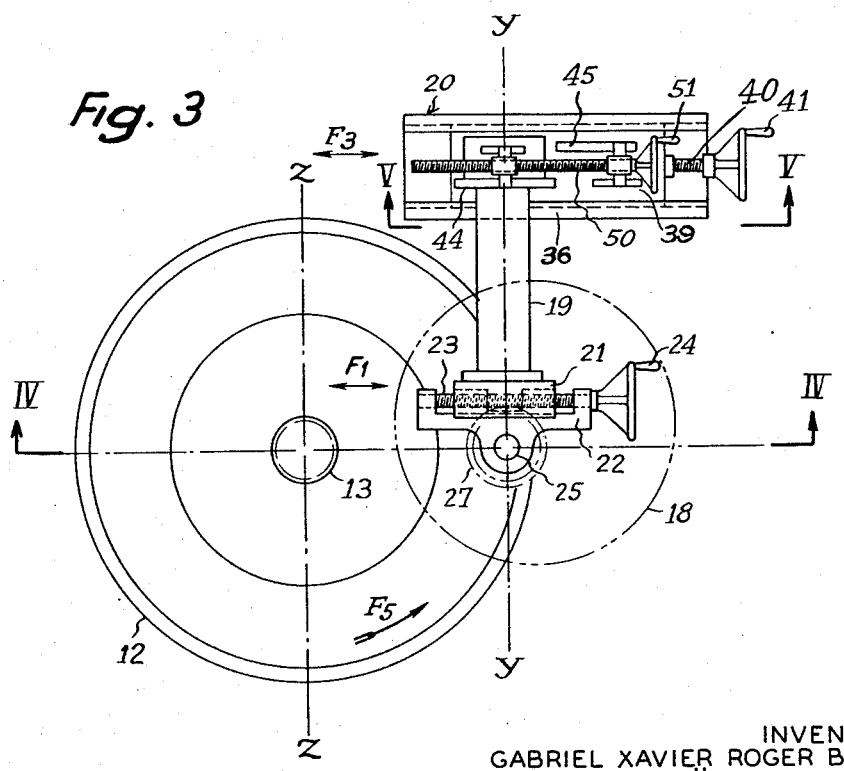
INVENTORS
GABRIEL XAVIER ROGER BOUSSU
LOUIS HENRI NOËL SAINT-FRISON
BY
THEIR ATTORNEYS

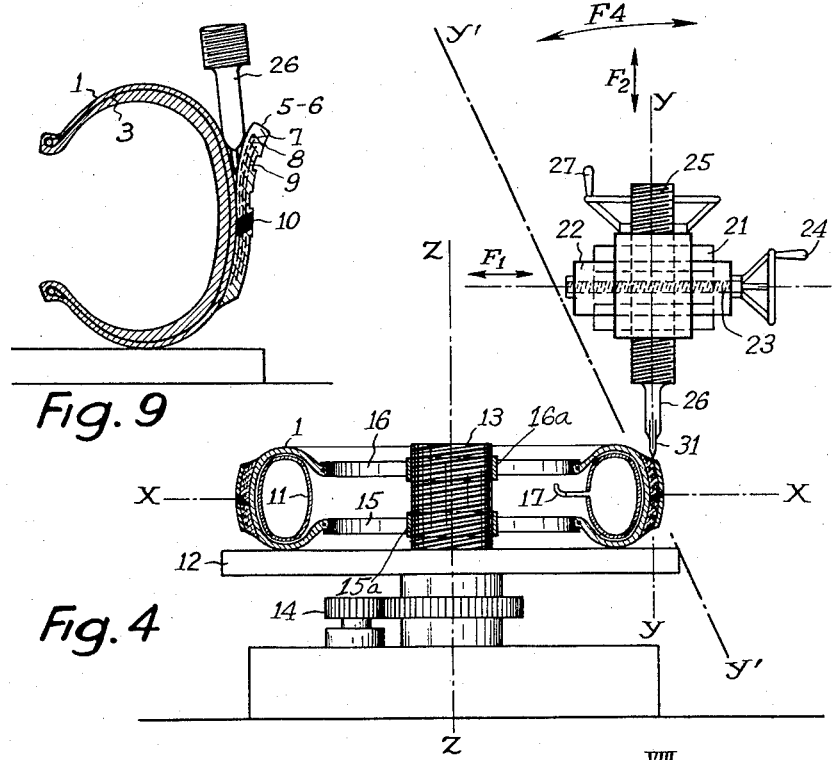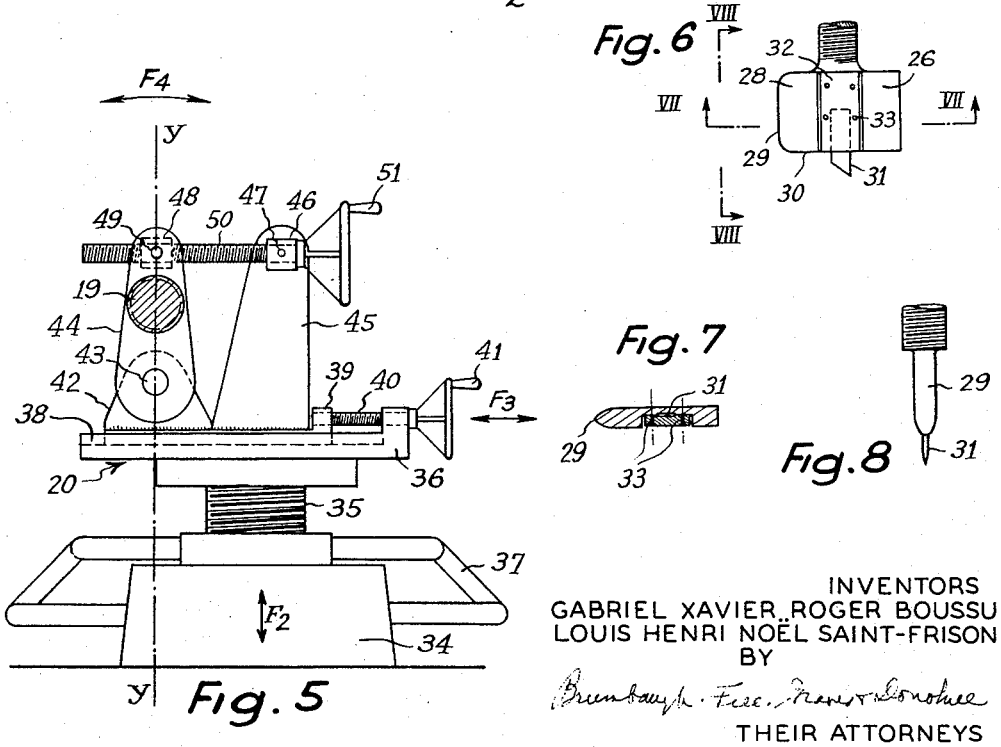

ated in the direction of arrow F3 to bring the cutter 26 to the correct position with respect to the tire casing 1 on the turntable 12.

United States Patent Office
3,002,549
Patented Oct. 3, 1961

3,002,549
TIRE RETREADING SYSTEM
Gabriel Xavier Roger Boussu, Chamalieres, and Louis Henri Noël Saint-Frison, Clermont-Ferrand, France, assignors to Michelin & Cie, Clermont-Ferrand, Puy-de-Dome, France
Filed Feb. 9, 1960, Ser. No. 7,654
2 Claims. (Cl. 157—13)

This invention relates to the retreading of pneumatic tire casings of the type wherein the tire tread is provided with reinforcing means in the form of sheets of metallic cable or wire, herein called "tread reinforcement," and wherein the carcass of the tire casing is likewise provided with reinforcing means in the form of one or more sheets of metallic cable or wire, herein called "carcass reinforcement."

Tire casings of a type including such tread reinforcements of preferably metallic wire or cable, have been disclosed in U.S. Patents Nos. 2,493,614, 2,811,998 and 2,884,040.

When such a tire casing is worn and/or damaged and is to be retread, it is first subjected to a preliminary check in order to detect, among other points, whether or not the tread reinforcement has been damaged. If such damage is found present and of such nature as to require replacement of the damaged reinforcement sheets, the tire casing is first stripped of the remnants of the tire tread, e.g., by a grinding or rasping process, and after that the damaged reinforcement sheet or sheets is or are removed by means of various cutting tools. This latter operation is at the present time chiefly performed manually; it is tedious and expensive.

It is an object of the invention to provide machinery for simultaneously removing the worn tire tread and the damaged tread reinforcement sheets, in an entirely mechanized manner and thereby to provide considerable savings in time.

The means of the invention comprise in combination a turntable for supporting a tire coaxially thereon, means for rotating the turntable about the axis thereof and of the tire, a cutter or knife adapted for insertion between the reinforcement sheets and the tire carcass, and means for adjusting the position of said cutter.

In use, the turntable is rotated and the cutter is slowly lowered down to penetrate between the tread reinforcement and the carcass reinforcement. When the cutter has reached substantially the longitudinal midplane of the tire, it is raised, and rotation of the turntable is thereafter arrested. The tire casing is then turned over so as to present its opposite side to the cutter. The cutting operation is repeated, and when the cutter has again reached substantially the longitudinal midplane of the tire, the tire carcass has been completely separated both from the tire tread and from the tread reinforcement.

A clearer understanding of the invention will be had from the ensuing description of an exemplary embodiment thereof made with reference to the accompanying drawings, wherein:

FIGURE 1 is a transverse cross section through a worn and damaged tire casing;

FIGURE 2 shows the same tire stripped of its worn tread band and damaged tread reinforcement sheets;

FIGURE 3 is a plan view of the machine of the invention;

FIGURE 4 is an elevational view, partly in section, on line IV—IV of FIGURE 3;

FIGURE 5 is an elevational view seen on line V—V of FIGURE 3;

FIGURE 6 shows the cutter assembly in elevation;

FIGURE 7 is a sectional view on line VII—VII of FIGURE 6;

FIGURE 8 is a side view on line VIII—VIII of FIGURE 6; and

FIGURE 9 is a transverse section on an enlarged scale showing the tire casing during the cutting operation.

Referring to FIGURE 1, 1 designates a tire casing having a carcass 2 containing a reinforcing ply 3 comprising cables held in place by being bent around the wires 4 in each of the base beads of the tire. Disposed outside the carcass is a tread reinforcement 5 made up of a plurality of superimposed plies of wire cables substantially coextensive with the tire tread band 6. In the illustrated example, the tread reinforcement 5 comprises three plies 7, 8 and 9. Indicated at 10 is a damaged area extending through the tread band 6 and all three sheets 7, 8 and 9. In order to recondition this casing it is necessary to remove the damaged tire tread 6 and the tread reinforcement 5.

For this purpose, the tire tread band 6 and the reinforcement 5 are simultaneously removed by means of the machine now to be described.

The machine includes a disk-like platform or turntable 12 secured to a vertical post or shaft 13 which extends through it and is coupled with the drive shaft of a motor, not shown, through gearing 14. The upper part of the shaft 13 is threaded and supports a coaxial pair of hoops 15 and 16 for engaging the beads of the tire casing 1 and mounting it on the turntable 12. Each of the hoops 15 and 16 is fixed to separate, internally threaded sleeves 15a and 16a threaded on the shaft 13.

The machine further includes a tool carrier unit generally designated 18 (FIGURE 3) secured to one end of an arm 19 projecting cantilever-fashion from a platform 20 (FIGURE 5). The tool carrier unit 18 includes a support 21 secured in fixed relation to the arm 19. The support 21 has a slideway formed on it in which a carriage 22 is slidable in the direction shown by arrow F1, by action of a screw shaft 23. The screw shaft is rotatable in threaded end flanges of the support 21 and is prevented from axial displacement with respect to the carriage. On one projecting end of the screw shaft 23 is secured a handwheel 24.

Slidably mounted in carriage 22 is another screw shaft 25 (FIGURE 4) at right angles to the screw shaft 23 and carrying at its lower end a cutter member 26. The screw shaft 25 is threadably received in the hub of a handwheel 27 mounted rotatably but non-axially movably on the carriage 22. By rotating the handwheel 27 while preventing rotation of screw shaft 25, the screw shaft 25 can be shifted up and down as indicated by arrow F2.

The cutter 26 (see FIGURES 6, 7 and 8) is in the form of a comparatively thick, generally rectangular plate 28 having a front vertical edge 29 and a horizontal bottom edge 30 tapered in thickness. Between this plate and a backing plate 32 attached to it by way of countersunk screws 33, is clamped a knife or cutter blade 31, having its cutting tip positioned somewhat below the edge 30 of the plate.

The platform 20 (FIGURE 5) on which the arm 19 is secured comprises a base 34 receiving slidably and non-rotatably a screw shaft 35 which supports a table 36. A handwheel 37 resting on the base 34 and threadably engaging the screw shaft 35 permits vertical adjustment of the table 36, as indicated by arrow F2, thereby adjusting the height of the arm 19 above the base 34 and relative to the turntable 12.

A plate 39 is slidably mounted in a slideway 38 in the table 36 for movement in the direction of arrow F3, i.e., transverse to the axis Y—Y of arm 19. A screw shaft 40 is threaded in a boss on the table 36 and is rotatably connected to the plate 39. A handwheel 41 is fixed to the shaft 40 for rotating it to permit the plate 39 to be adjusted along the table 36. Such adjustment is effected just before starting a cutting operation in order to position the arm 19 at the proper distance from the plane Z—Z (see FIGURES 3 and 4) so as to allow for variations in the diameter of the tire casings to be handled.

A bearing 42 is rigidly secured to the plate 39 and carries, by means of a pivot 43, a vertical support member 44 having the aforementoned arm 19 fixed and extending approximately perpendicular to it. An upright 45 is fixed to the plate 39 at a suitable distance from the bearing 42 and carries a journal block 46 mounted on a pivot 47. Similarly, the support member 44 carries an internally threaded journal block 48 mounted on a pivot 49. Both blocks 46 and 48 are interconnected by means of a screw shaft 50 which is retained against axial movement with respect to journal 46 and is threaded into the block 48. Rotation of a handwheel 51 fixed to the shaft 50 causes the support member 44 to move around its pivot 43 as shown by arrow F4. The pivotal movement of the support member 44 causes the arm 19 and the tool-carrier unit 18 to swing to the left or to the right from axis Y—Y. Thus, it will be understood that the handwheel 51 enables the cutter 26 to be inclined within a certain angular range.

The machine described operates as follows:

The tire casing to be conditioned for retreading first has inserted into it an inflatable inner tube 11 (FIGURE 4) and the assembly is positioned on the turntable 12 by means of hoops 15 and 16. The valve 17 of the inflatable tube is connected with a source of compressed air, not shown, and the tube is inflated to a sufficient pressure to assure that the cutter, on insertion thereof into the tire casing, will meet with sufficient resistance to produce an effective cutting action. The inflating pressure suitable for this purpose may vary as from 1 to 2 kg. per sq. cm. depending on the type of tire.

The operator then sets the turntable 12 into rotation (in the direction of arrow F5 in FIGURE 3), and adjusts the blade 31 into vertical alignment with the base of the tread reinforcement 5. This adjustment is performed by rotation of the wheels 24, 27 and 51. At this time, the longitudinal axis of the screw shaft 25 which carries the cutter 26 forms an angle of from about 30° to 40° with the axis Y—Y. This position is indicated by axis Y'—Y' in FIGURE 4. The operator then lowers the blade 31 by slowly rotating wheel 27 until the blade just touches the wire reinforcement of the carcass 3 (FIGURE 1). This contacting position of the blade with the wire reinforcement is clearly indicated by a characteristic whistling sound caused by the blade rubbing against the reinforcing wires. The operator must then reduce the inclination of the shaft 25 with respect to axis Y—Y. Then he again turns wheel 27 to lower the blade 31. The cutter plate 26 now cuts into the tire following the knife blade 31. Since the cutter plate 26 is considerably thicker than the knife blade 31, it forces the cut sections of the tire apart, and thus facilitates further penetration of the blade 31. As shown in FIGURE 9, the left-side surface of cutter 26 bears against the tire carcass, while its right-side surface engages the tread reinforcement 5 rubbing against the wire sheet 7 thereof, and thereby forces said tread reinforcement 5 away.

The operator gradually lowers blade 31 further by turning the handwheel 27 or 51, and, if necessary, shifts the blade to the right by turning handwheel 24 in the proper direction until the longitudinal midplane X—X of the tire is reached. At this time, the operator raises the cutter attachment, then arrests rotation of turntable 12, and turns the tire casing over on the turntable so as to present the other half of the tire tread for separation from its reinforcement. This operation is performed by a procedure similar to that described above, until the blade 31 has again reached the longitudinal midplane X—X of the tire. The tire is then removed from its supporting hoops 15 and 16, and the inflatable tube 11 is deflated and removed. The tire carcass 2 is then readily separated from the annular assembly comprising the worn tread band 6 and its reinforcement 5. The tire carcass 2 now has the appearance shown in FIGURE 2 and is in a condition for subsequent retreading operations.

The machine described by way of example may, of course, be modified in various ways without departing from the scope of the invention. Thus, the drive means for turntable 12 may differ from the means described. The rotation of arm 19 may be performed by some other mechanical means, such as worm and worm wheel gearing, or an automatic or semi-automatic guiding arrangement using a pattern or master-cam corresponding in contour to that of the tire to be conditioned. Various accessory devices may be attached, such as means for spraying the knife assembly with cooling or lubricating fluid.

We claim:

1. Apparatus for removing tread bands and tread reinforcements from tire casings comprising a turntable, means for supporting said turntable for rotation about its axis, means for rotating said turntable, means for supporting a tire casing in fixed relation to said turntable in substantially concentric relation to said axis, cutter means movably mounted adjacent to said turntable, and means for moving said cutter means toward and away from said turntable and transversely thereof to engage said tire casing in cutting relation thereto, said means for moving said cutter means including a platform, a supporting member extending from said platform and pivotally connected at one end to said platform, an arm secured to said cutter means and fixed to said supporting member and extending substantially parallel with the axis of pivotal movement of said supporting member, and means for adjusting said arm pivotally relative to said platform.

2. The apparatus set forth in claim 1 comprising means for adjusting said platform relative to said turntable along an axis substantially parallel with the axis of rotation of said turntable.

References Cited in the file of this patent

UNITED STATES PATENTS

| | | |
|---|---|---|
| 1,404,118 | Hargraves | Jan. 17, 1922 |
| 1,687,465 | Stevens | Oct. 9, 1928 |
| 2,086,254 | Browning | July 6, 1937 |
| 2,200,575 | Haskins | May 14, 1940 |
| 2,269,137 | Wikle | Jan. 6, 1942 |
| 2,645,147 | Hawkinson | July 14, 1953 |
| 2,925,125 | Curry | Feb. 16, 1960 |